United States Patent [19]

Terry et al.

[11] Patent Number: 5,167,273
[45] Date of Patent: Dec. 1, 1992

[54] ASPIRATOR TUBE CHECK VALVE ASSEMBLY AND METHOD OF CONTINUOUSLY SENSING VEHICULAR INTERIOR COMPARTMENT AIR TEMPERATURE

[75] Inventors: Joseph L. Terry, Brighton; Leonard J. Flack, Garden City, both of Mich.

[73] Assignee: Ford Motor Company, Dearborn, Mich.

[21] Appl. No.: 812,032

[22] Filed: Dec. 23, 1991

[51] Int. Cl.⁵ .......................... B60H 1/24; B60H 1/00
[52] U.S. Cl. ............................ 165/1; 165/16; 165/43; 236/49.3; 236/DIG. 19; 417/151; 417/182; 417/189; 454/75
[58] Field of Search .............. 165/16, 42, 43; 417/151, 182, 189; 98/2; 454/75, 69; 236/49.3, DIG. 19

[56] References Cited

U.S. PATENT DOCUMENTS

| | | | |
|---|---|---|---|
| 1,159,957 | 8/1915 | Kneass | 417/189 |
| 1,546,560 | 7/1925 | Bradbury | 417/189 |
| 1,874,294 | 8/1932 | Horton et al. | 417/182 |
| 2,316,619 | 4/1943 | Raney | . |
| 2,381,589 | 8/1945 | Hayes | 417/182 |
| 3,208,399 | 9/1965 | Keller | 417/151 |
| 3,411,311 | 11/1968 | Wegman | . |
| 3,738,572 | 6/1973 | Hall, Jr. | . |
| 4,554,786 | 11/1985 | Takeuchi et al. | 417/151 |
| 4,623,090 | 11/1986 | Heger | . |
| 4,631,003 | 12/1986 | Chamberlin et al. | 417/151 |
| 4,682,536 | 7/1987 | Nolting | 236/DIG. 19 |
| 4,795,090 | 1/1989 | Koukal et al. | 236/49.3 |
| 4,835,981 | 6/1989 | Rinholen | . |
| 5,002,465 | 3/1991 | Lagen et al. | 417/182 |

FOREIGN PATENT DOCUMENTS

| | | | |
|---|---|---|---|
| 3541263 | 5/1987 | Fed. Rep. of Germany | 98/2.01 |
| 52-47236 | 4/1977 | Japan | . |
| 62-214010 | 9/1987 | Japan | . |
| 0225413 | 10/1987 | Japan | 98/2 |

Primary Examiner—John K. Ford
Attorney, Agent, or Firm—Roger L. May; Charles H. Ellerbrock

[57] ABSTRACT

An interior air temperature sensing system is provided for use with a vehicle interior compartment air temperature regulating system including an ambient air inlet duct, a blower housing connected to an air inlet duct and an air temperature modifier and a blower situated within the blower housing. The blower draws air from the air inlet duct under negative pressure and conveys the air at positive pressure past the air temperature modifier to the interior compartment. The air temperature sensing system includes an air temperature sensor and a venturi valve coupled to the negative pressure area of the blower. The valve includes an inlet port, and outlet port and a venturi section extending therebetween defining a point of minimum flow area, or valve seat. The valve also includes a diverter channel having a first port in communication with the inlet port and a second port in communication with the outlet port and a plug member situated between the inlet port and the outlet port and having a diameter greater than the valve seat. As the blower draws ambient air from the inlet duct, interior compartment air is drawn by the sensor and through the venturi valve and across the valve seat and out the outlet port. If the ambient air pressure exceeds the blower output pressure, the plug member is forced onto the valve seat to divert the oncoming air through the diverter channel creating a secondary venturi and continuing to draw air from the sensor, through the diverter channel to discharge elsewhere within the interior compartment.

17 Claims, 2 Drawing Sheets

ASPIRATOR TUBE CHECK VALVE ASSEMBLY AND METHOD OF CONTINUOUSLY SENSING VEHICULAR INTERIOR COMPARTMENT AIR TEMPERATURE

TECHNICAL FIELD

This invention relates to vehicular interior climate control systems, and particularly to an apparatus for continuously drawing interior compartment air through an air temperature sensing device.

BACKGROUND

In conventional electronic automatically controlled vehicular heating and air conditioning systems, it has been the practice for many years to include an air temperature sensing device for maintaining the interior air temperature at regulated preselected levels. This device is normally located behind the dash, reasonably close to the uppermost areas of the dashboard. Interior air is drawn through a vent in the dash and then through the air temperature sensor by means of establishing a negative pressure at the downstream end of the sensor. This is usually accomplished by connecting an air line from the outlet end of the sensor to a venturi valve. One such arrangement is shown in U.S. Pat. No. 2,316,619 issued to Raney, wherein the venturi valve is located within the downstream tube leading from the temperature sensor with air from the positive pressure end of a blower being passed through the venturi to create the area of negative pressure in communication with the sensor outlet.

Another arrangement known in the prior art is to connect a similar venturi valve device to the positive pressure end of a blower housing. Each such system is fairly similar and each would apparently work equally well provided the positive pressure is controlled by the outlet of the blower. However, under certain conditions, namely at low blower speeds and vehicle speeds in excess of 15 to 20 miles per hour, the ambient air introduced into the system is at a higher pressure than the blower output, which destroys the negative pressure across the temperature sensor outlet, thereby rendering the air temperature sensing system inoperative.

SUMMARY OF INVENTION

This invention contemplates a vehicular interior compartment air sensing system which provides a continuous flow of interior air to a temperature sensor at all operating speeds of the blower and independently of the speed at which the vehicle is moving.

This invention further contemplates a vehicular interior compartment air sensing system whereby interior air is constantly moved through the temperature sensor by providing a continuous source of negative pressure on the outlet end of the sensor.

This invention further contemplates a vehicular interior compartment air sensing system which includes a venturi valve located at the negative pressure side of the blower assembly adjacent the air inlet duct.

This invention further contemplates a vehicular interior compartment air sensing system wherein the above mentioned venturi valve includes a means for utilizing positive pressure air flow as may be created when the vehicle speed is far in excess of the relative blower speed in such a manner that the positive air flow passes through a second venturi valve means within the venturi valve to create a negative air pressure zone within the venturi valve itself and thereby continuously drawing air through the inlet end of the valve through the air temperature sensor outlet.

The invention also contemplates a vehicle interior compartment air temperature regulating system including an ambient air inlet duct, a blower housing connected to the air inlet duct at one end and to an air temperature modifying means at the other end, the air temperature modifying means being one or both of a heater assembly and an evaporator coil assembly each of which may be selectively regulated by an air temperature regulating control means. A blower is situated within the blower housing at one end thereof for drawing air from the air inlet duct under negative pressure and conveying the air at positive pressure past the air temperature modifying means and to an air diverter which may divert air to selective portions of the interior compartment. An interior air temperature sensing system is also provided comprising an air temperature sensor and a venturi valve. The venturi valve is operatively coupled with the negative pressure area of said blower and includes an inlet port, an outlet port and a throughbore open to said inlet port and outlet port. The venturi valve has a primary venturi section therebetween defined by a converging wall portion terminating at a point of minimum flow area and defining a valve seat. A diverter channel is also provided including a first port in open communication with the inlet port at the upstream side of said valve seat and a second port in open communication with the outlet port at the other side of the valve seat. The venturi valve further includes a plug member of a diameter less than said port and greater than said valve seat, and means for retaining the plug member in the throughbore between the outlet port and the valve seat. The temperature sensor is operatively coupled to the venturi valve upstream of said inlet part. As the blower draws ambient air from the inlet duct, interior compartment air will be drawn through the sensor and then through the venturi valve across the venturi section and valve seat and out the outlet port to combine with the ambient air to be passed through the blower. If the ambient air pressure exceeds the blower output pressure, the resultant positive pressure through the outlet port will force the plug member onto the valve seat and thereby divert the oncoming air through the diverter channel creating a secondary venturi and continuing to draw air from the sensor, through the diverter channel, to discharge elsewhere within the interior compartment.

The invention further contemplates a method of continuously drawing vehicular interior compartment air through an air temperature sensing means by utilizing the negative pressure at the inlet end of the blower during certain operating conditions and by converting within a diverter valve any positive pressure inlet to a source of negative pressure by providing the diverter valve with a supplementary venturi system.

These and other objects and features of the invention will be readily appreciated by one of ordinary skill in the art from the following detailed description of the best mode for carrying out the invention when taken in connection with the following drawings.

BEST MODE FOR CARRYING OUT THE INVENTION

Figure 1:
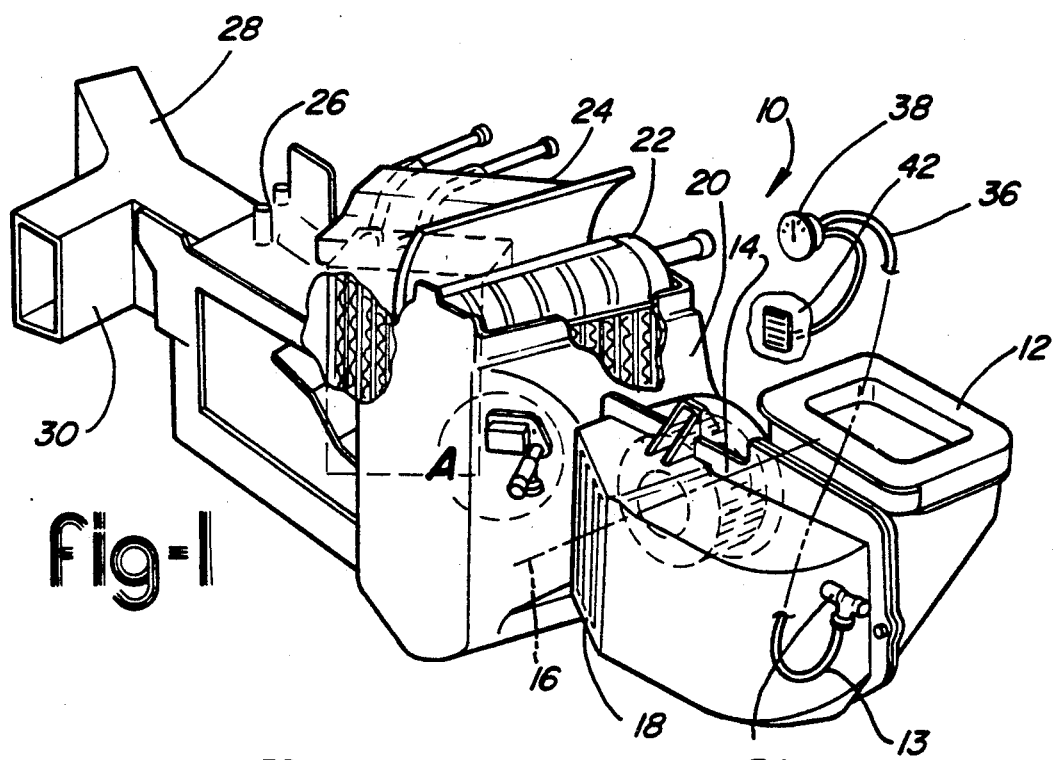
FIG. 1 is a schematic representation of a vehicular interior compartment heating and air conditioning system including an air temperature sensing system in accordance with the present invention.

Referring now to FIG. 1, there is illustrated the general configuration of a vehicular climatic control system consisting of an ambient air inlet duct extending from the front of the vehicle and leading in under the dash to a blower housing and air ducting system, shown generally by reference numeral 10. An air inlet duct 12 discharges into the blower housing 13 at one end thereof located proximate the blower 14 contained within the housing. Preferably, the blower 14 is of the squirrel cage type and generally oriented so as to rotate about an axis designated 16.

At the discharge end of the blower 14 there is located a cut-off section 18 within the housing over which the blower air is caused to pass. The cut-off section 18 leads to a positive pressure chamber 20 in the housing and vents to an evaporator coil system 22 and from there to a heater core assembly 24 and finally to an air discharge end 26. Heated or cooled air may be discharged therefrom through ducting sections 28 and 30 to various locations within the vehicle interior compartment.

With continuing reference to FIG. 1, at the ambient air inlet end of the housing, at a portion of the ducting or housing which will be subjected to negative pressure at the inlet end of the blower, there is located a venturi valve member 34. Leading to the venturi valve member 34 from an inlet vent 42 mounted on the dashboard of the vehicle interior is an air line 36, which includes an air temperature sensing device 38 disposed along its length.

In operation, it is the function of the blower 14 to draw in ambient air from the inlet duct and pass it through the housing, where the air temperature can be modified by separate controls on the air conditioning system, which will pass refrigerant through the evaporator coils, or through the heater core assembly 24 which will elevate the temperature of the incoming air. The temperature is regulated by controls (not shown) proximate to the occupant. The interior regulated air is then drawn through the vent 42 and over the temperature sensing device 38 to determine if the air temperature has reached the level as prescribed by the controls. Since the system functions best if a continuous flow of air passes through the temperature sensor, the outlet end 46 of the temperature sensing device 38 is connected to a venturi valve 34 located at the inlet end of the blower 14 which is subjected to negative pressure. In the preferred embodiment, the suction in the air line 36 draws air from the interior of the vehicle through the temperature sensor 38 and through the venturi valve 34 and then it is discharged to the incoming air being passed through the blower 14. As long as the vehicle is moving at a speed slow enough relative to the speed of the blower that the negative pressure is maintained, the temperature sensing system will operate as described above. However, should an increased vehicle speed cause the incoming air to overrun the capacity of the blower and thereby produce a positive air pressure condition at the inlet end of the blower, the venturi valve 34, in accordance with the present invention, is constructed such that the air will be rerouted through a supplemental venturi system and thereby continue to provide a negative pressure within the valve itself which in turn will continue to draw air through the temperature sensor 38.

Figure 2:
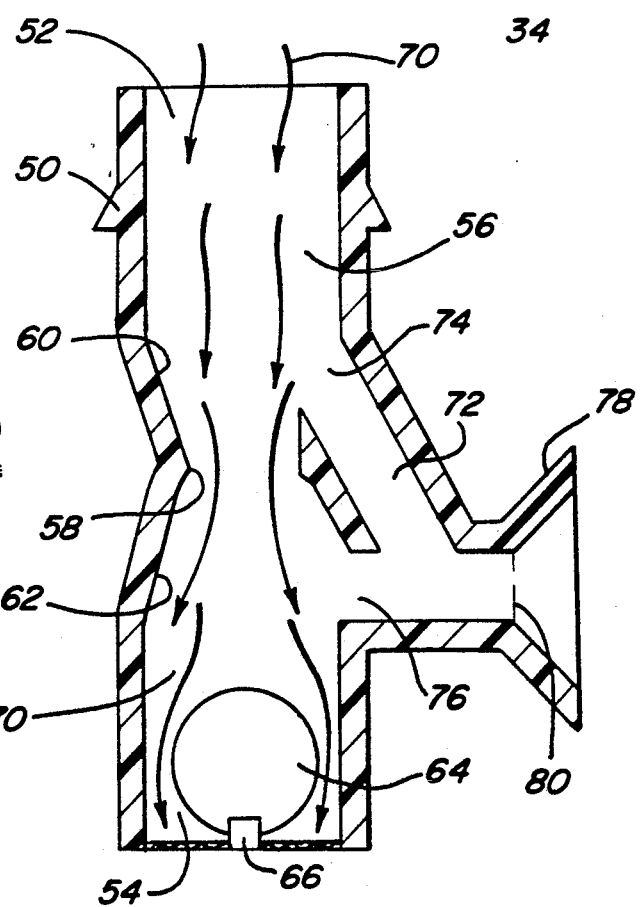
FIG. 2 is a cross-sectional side view of a first embodiment of a venturi valve in accordance with the present invention during normal blower operation.

Referring now to FIG. 2, the venturi valve 34 is shown under normal flow conditions, i.e. when there exists a negative pressure at the inlet end of the blower. Preferably, the venturi valve 34 comprises a molded plastic valve body 50 having an inlet port 52 for receiving air from the temperature sensor 38 and an outlet port 54 connected to, and in open communication with, the interior of the blower housing 13. Extending between the inlet and outlet ports 52 and 54 is a throughbore 56 having a valve seat 58 formed approximately midway at the juncture of two oppositely converging conical wall sections 60, 62. A ball valve 64 is located within that portion of the throughbore 56 between the valve seat 58 and the outlet port 54. To preclude the ball from passing out of the outlet port 54, there is provided a grid plate 66 having a plurality of vents disposed therein and being secured in a suitable manner to the outlet port.

As shown in FIG. 2, the diameter of the ball valve 64 is substantially less than that of the inner diameter of the throughbore such that there is defined an effective flow area across the ball. This flow area is approximately equal to that of the flow area across the valve seat 58. In normal operation, the flow of air through the venturi valve 34 is as shown by the arrows 70, whereby incoming air from the air temperature sensor 38 passes from the inlet port across the valve seat 58, over the ball valve 64 and through the outlet port 54 to the blower housing. This is the manner of operation so long as there is a negative pressure at the outlet port 54 drawing air through the valve.

With continuing reference to FIG. 2, it will be seen that the venturi valve 34 also includes a secondary channel structure comprising a diverter channel 72 having a first port 74 open to the conical wall section 60 at the upstream end of the venturi valve. The diverter channel 72 also includes a second port 76 open to the conical wall section 62 at the downstream end of the valve seat 58. The diverter channel 72 terminates at a second and supplemental venturi valve portion 78 including a restricted flow throat 80 which is in open flow communication with the diverging conical wall section 62.

Figure 3:
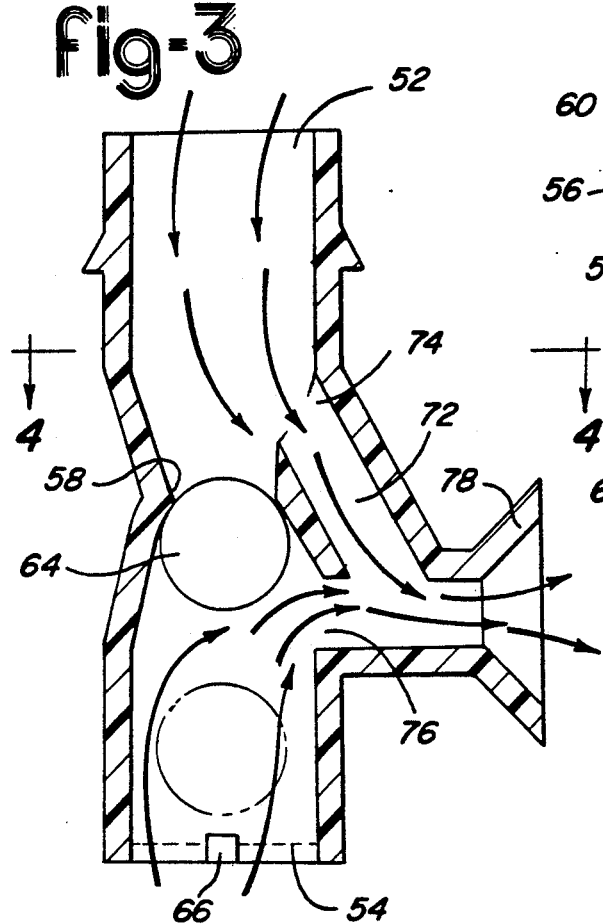
FIG. 3 is a view similar to FIG. 2 showing a venturi valve in operation in response to a positive pressure condition at the normal outlet end of the diverter valve.

Referring now to FIG. 3, in the event the vehicle speed overcomes the capacity of the blower to draw air, such that a positive pressure condition exists at the outlet port 54, the ball valve 64 will be caused to flow up into the conical wall section 62 and seat itself at the valve seat 58. This will cause the air from the blower housing 13 to pass through the second port 76 and out through the supplemental venturi 78. The negative pressure generated at the supplemental venturi is sufficient to divert air coming in from the inlet port 52 through the first port 74 and out the diverter channel 72 and to be then discharged through the supplemental venturi to the vehicle anterior at a point under the dash.

Figure 5:
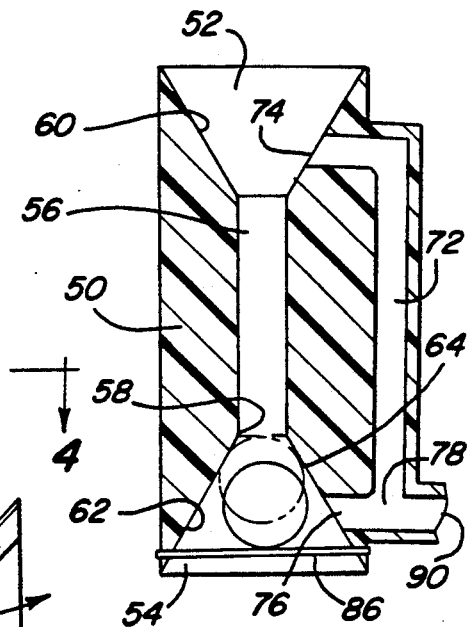
FIG. 5 is a partial cross-sectional side view, similar to FIG. 2 and showing a second embodiment of the present invention.
Figure 4:
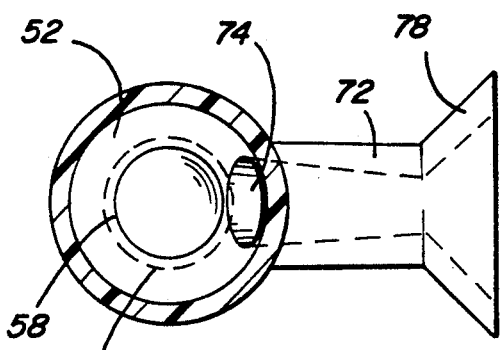
FIG. 4 is a cross-sectional plan view taken along line 4—4 of FIG. 3.

A second embodiment of the venturi valve is shown in FIG. 5. Like reference numerals are used to indicate the same elements as shown and described in the first embodiment of FIGS. 2–4. As shown in FIG. 5, the venturi valve includes an inlet port 52, an outlet port 54 and a throughbore 56 connected thereto. The inlet and outlet ports are defined in part by the conical sections 60 and 62, respectively. At a point where the conical wall section 62 joins the throughbore 56, there is formed a valve seat 58. A ball valve 64 resides within the conical wall section 62 between the outlet port 54 and the valve seat 58. It is maintained within this area by means of a pin 86 which passes through the outlet port and is secured to the valve body 50. First port 74 and second port 76 are in open communication with the conical wall sections 60 and 62, respectively, and lead to a diverter channel 72 and thence to a discharge end 90. At the juncture of the diverter channel section coming from the first port 74 and the diverter channel section coming from the second port 76 there is defined a supplemental venturi 78. As with the operation of the first embodiment, when positive pressure exists at the outlet port 54, the ball valve is forced against valve seat 58 which in turn forces air from the blower housing through the second port 76 and out the discharge end 84 of the diverter channel. This in turn causes a negative pressure at the venturi 78 and draws air in a continuous pattern and without interruption to flow through the temperature sensor (not shown).

Figure 6:
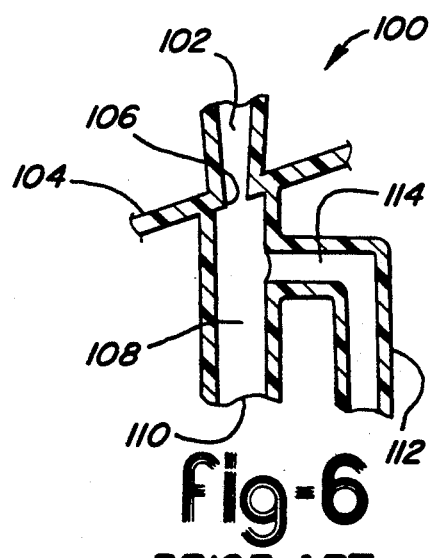
FIG. 6 is an exploded view of the prior art device as located at the positive pressure end of the blower housing in the area subscribed by the dotted line circle denoted A in FIG. 1.

For comparative purposes, there is shown in FIG. 6 a prior art venturi valve arrangement. As illustrated, this venturi valve 100 includes an inlet port 102 located within the blower housing 104 and defining a venturi section by means of a conical wall section diverging toward a venturi throat 106 and thence through a throughbore 108 to an outlet end 110. At the outlet end of the venturi valve and nearest the venturi throat section there is a branch member 112 having a throughbore 114 in open communication with the downstream end of the throughbore 108 at the downstream end of the throat section 106. As shown in FIG. 1 in the encircled dash line area, designated "A", the prior art venturi valve is located at the positive pressure end of the blower housing. Consequently, positive pressure air is forced through the inlet port 102 across the venturi throat 106 and out the outlet port 110. This creates a condition of negative pressure at the discharge end of the tube which in turn is connected with the outlet end of the temperature sensor (not shown). Consequently, air is drawn through the venturi valve at the inlet port 102 in a continuous fashion so long as a regulated positive pressure is maintained across the venturi valve. At low blower speeds and a vehicle speed in excess of 15 to 20 miles per hour, it has been found that the air velocity across the valve exceeds this positive pressure limitation and as a result creates a positive pressure on the other side of the venturi valve which in turn interrupts the flow of air from the air temperature sensing device.

It is understood, of course, that while the form of the invention herein shown and described constitutes the preferred embodiment of the invention, it is not intended to illustrate all possible forms thereof. It will also be understood that the words used are words of description rather than limitation, and that various changes may be made without departing from the spirit and scope of the invention as disclosed.

We claim:

1. A method of continuously drawing air from a vehicle interior compartment through an air temperature sensor, wherein the air temperature regulation system controlled by the air sensor includes a blow for drawing in ambient air and circulating or recirculating the air through the system including the sensor, the method comprising;
    connecting the outlet end of the sensor to the negative pressure inlet end of the blower;
    drawing interior compartment air through the sensor under a constant source of negative pressure throughout all blower speeds; and
    providing a vale means between the outlet end of the sensor and the blower which in response to the negative pressure from the blower will divert sensor air flow through a first flow path, and in response to a positive pressure from the blower will divert sensor air flow under a partial vacuum through a second flow path.

2. In a vehicle interior compartment air temperature regulating system having a blower for circulating air therethrough;
    an air temperature sensing means including a sensor through which air from the interior compartment is caused to be drawn, said sensor including an outlet end connected to the negative pressure inlet end of the blower;
    means, including diverter valve means, for continuously drawing air through said sensing means under a constant source of negative pressure throughout all blower speeds; and
    said diverter valve means being placed between the outlet end of the sensor and the blower and being operative in response to the negative pressure from the blower to divert sensor air flow through a first flow path, and being operative in response to a positive pressure from the blower will divert sensor air flow under a partial vacuum through a second flow path.

3. In a vehicle interior compartment air temperature regulating system,
    a venturi valve member connected to and in open communication with the interior of a blower housing at the negative pressure end of a blower,
    said valve member including an inlet port, an outlet port, a throughbore open to said inlet port and outlet port, and having a venturi section therebetween defined by a converging wall portion terminating at a point of minimum flow area and defining a valve seat, a diverter channel including a first port in open communication with the inlet port at the upstream side of said valve seat and a second port in open communication with the outlet port at the other side of the valve seat,
    said valve member including a plug member reciprocal within the said valve member between said valve seat and said outlet port, said plug member including means for plugging said throughbore when seated upon said valve seat in response to a positive pressure within said valve housing, and means for retaining said plug member in said throughbore between said outlet port and said valve seat.

4. In combination with a vehicle interior compartment air temperature regulating system including an ambient air inlet duct, a blower housing connected to the air inlet duct at one end and to an air temperature modifying means at the other end, the air temperature modifying means being one or both of a heater assembly and an evaporator coil assembly each of which may be selectively regulated by an air temperature regulating control means, a blower situated within the blower housing intermediate the ends thereof for drawing air from the air inlet duct under negative pressure and conveying the air at positive pressure past the air temperature modifying means and to an air director which may direct air to selective portions of the interior compartment, an interior air temperature sensing system comprising an air temperature sensor, and a venturi valve, said venturi valve being operatively coupled with the negative pressure area of said blower, said venturi valve including an inlet port, an outlet port, a throughbore open to said inlet port and outlet port, and having a venturi section therebetween defined by a converging wall portion terminating at a point of minimum flow area and defining a valve seat, a diverter channel including a first port in open communication with the inlet port at the upstream side of said valve seat and a second port in open communication with the outlet port at the other side of the valve seat, said venturi valve including a plug member having a diameter less than said port and greater than said valve seat, and means for retaining said plug member in said throughbore between said outlet port and said valve seat, said temperature sensor being operatively coupled to said venturi valve upstream of said inlet port, whereby as the blower draws ambient air from the inlet duct, interior compartment air will be drawn through the sensor and then through the venturi valve across the venturi section and valve seat and out the outlet port to combine with the ambient air to be passed through the blower, and whereby in the event the ambient air pressure exceeds the blower output pressure the resultant positive pressure through the outlet port will force the plug member onto the valve seat and thereby divert the oncoming air through the diverter channel creating a secondary venturi and continuing to draw air from the sensor, through the diverter channel, to discharge elsewhere within the interior compartment.

5. The invention of claim 4 wherein said valve member is a molded plastic member.

6. The invention of claim 4 wherein the diverter channel includes a second supplemental venturi section at the discharge end thereof, thereby creating a source of negative pressure within the venturi valve member for drawing air through the diverter channel.

7. The invention of claim 6 wherein the flow area of said first port and said second port are substantially equal and less than that of said venturi section.

8. The invention of claim 7 wherein the flow area through said venturi section is substantially equal to the effective flow area around said plug member at the outlet port.

9. The invention of claim 8 wherein retention means are provided at said outlet port for retaining said plug member within said conical wall section between the valve seat and said outlet port.

10. The invention of claim 9 wherein said plug member is in the shape of a ball.

11. In a vehicle interior compartment air temperature regulating system, a venturi valve member connected to and in open communication with the interior of a blower housing at the negative pressure end of a blower, said valve member including an inlet port, an outlet port, a throughbore open to said inlet port and outlet port, and having a venturi section therebetween defined by a converging wall portion terminating at a point of minimum flow area and defining a valve seat, a diverter channel including a first port in open communication with the inlet port at the upstream side of said valve seat and a second port in open communication with the outlet port at the other side of the valve seat, said valve member including a plug member having a diameter less than said outlet port and greater than said valve seat, and means for retaining said plug member in said throughbore between said outlet port and said valve seat.

12. The invention of claim 11 wherein the diverter channel includes a second supplemental venturi section at the discharge end thereof, thereby creating a source of negative pressure within the venturi valve member for drawing air through the diverter channel.

13. The invention of claim 11 wherein said valve member is a molded plastic member.

14. The invention of claim 11 wherein the flow area of said first port and said second port are substantially equal and less than that of said venturi section.

15. The invention of claim 14 wherein the flow area through said venturi section is substantially equal to the effective flow area around said plug member at the outlet port.

16. The invention of claim 15 wherein retention means are provided at said outlet port for retaining said plug member within said conical wall section between the valve seat and said outlet port.

17. The invention of claim 15 wherein said plug member is in the shape of a ball.

* * * * *